(12) United States Patent
Evans et al.

(10) Patent No.: US 9,004,401 B2
(45) Date of Patent: Apr. 14, 2015

(54) ELECTRICAL ACTUATOR INCORPORATING A FREE PLAY MECHANISM TO ELIMINATE FORCE FIGHTING

(71) Applicant: Triumph Actuation and Motion Control Systems—UK, Ltd, Flintshire (GB)

(72) Inventors: Royston Evans, Stonehouse Gloucestershire (GB); Malcolm Tierney, Cheltenham Gloucestershire (GB)

(73) Assignee: Triumph Actuation Systems—UK, Ltd., Flintshire (GB)

( * ) Notice: Subject to any disclaimer, the term of this patent is extended or adjusted under 35 U.S.C. 154(b) by 176 days.

(21) Appl. No.: 13/733,932

(22) Filed: Jan. 4, 2013

(65) Prior Publication Data

US 2013/0181091 A1 Jul. 18, 2013

(30) Foreign Application Priority Data

Jan. 6, 2012 (GB) .................................. 1200181.4

(51) Int. Cl.
| | |
|---|---|
| *B64C 25/10* | (2006.01) |
| *B64C 25/26* | (2006.01) |
| *F16H 25/14* | (2006.01) |
| *F16H 35/14* | (2006.01) |

(52) U.S. Cl.
CPC ................ *B64C 25/26* (2013.01); *F16H 25/14* (2013.01); *F16H 35/14* (2013.01)

(58) Field of Classification Search
USPC .............. 244/102 SL, 102 A, 102 SS, 102 R; 74/53–55
See application file for complete search history.

(56) References Cited

U.S. PATENT DOCUMENTS

| 5,022,609 A | 6/1991 | Cranston |
| 5,029,775 A * | 7/1991 | Abramovitsh ............ 244/102 R |
| 5,176,037 A * | 1/1993 | Kasprzyk ........................ 74/53 |

(Continued)

FOREIGN PATENT DOCUMENTS

| CA | 2618455 | 3/2007 |
| CA | 2728235 | 7/2011 |

(Continued)

OTHER PUBLICATIONS

GB Search Report from corresponding British Application No. 1200181.4, Dated Jun. 12, 2012.
Ziegler et al., High Force Linear Actuator for an Aeronautical Applicatoin. Association With a Fault Tolerant Converter, IEEE, pp. 1-5, 2007.

(Continued)

*Primary Examiner* — Christopher P Ellis
*Assistant Examiner* — Medhat Badawi
(74) *Attorney, Agent, or Firm* — Thomas H. Walls; Dann, Dorfman, Herrell and Skillman, P.C.

(57) ABSTRACT

An actuator which is operable in response to one of an electrical and an electro-mechanical input signal is provided. The actuator includes an outer casing defined about a central axis, an output shaft disposed within the casing, the output shaft being axially moveable over a stroke length. Further, the actuator also includes a drive mechanism co-operable with the output shaft to drive the output shaft along a part of the stroke length, wherein the actuator is configured such that the output shaft is drivable along all or part of the remainder of the stroke length by external loading while being unconstrained by the drive mechanism.

9 Claims, 3 Drawing Sheets

(56) References Cited

U.S. PATENT DOCUMENTS

| | | | | |
|---|---|---|---|---|
| 5,299,761 | A * | 4/1994 | Robin et al. | 244/102 SS |
| 8,602,352 | B2 * | 12/2013 | Keller et al. | 244/102 A |
| 2004/0026175 | A1 | 2/2004 | Oh et al. | |
| 2009/0026890 | A1 | 1/2009 | Goat et al. | |
| 2009/0187293 | A1 | 7/2009 | Trotter et al. | |
| 2010/0012779 | A1 | 1/2010 | Collins | |
| 2010/0219290 | A1 * | 9/2010 | Luce | 244/102 SL |
| 2010/0252691 | A1 * | 10/2010 | Malkin et al. | 244/76 R |
| 2011/0024557 | A1 | 2/2011 | Brighton | |
| 2011/0068221 | A1 * | 3/2011 | Recksiek et al. | 244/99.5 |
| 2012/0080559 | A1 | 4/2012 | Keller | |
| 2013/0181091 | A1 * | 7/2013 | Evans et al. | 244/102 A |

FOREIGN PATENT DOCUMENTS

| | | |
|---|---|---|
| CH | 215809 | 10/1941 |
| CN | 102162509 | 8/2011 |
| EP | 1902947 | 3/2008 |
| EP | 2107273 | 10/2009 |
| EP | 2130765 | 12/2009 |
| WO | PCT/GB07/000726 | 9/2007 |

OTHER PUBLICATIONS

Search Report from corresponding GB Application No. 1208155.0, dated Jul. 31, 2012.

Search Report from corresponding GB Application No. 1208179.0, dated Aug. 9, 2012.

* cited by examiner

ELECTRICAL ACTUATOR INCORPORATING A FREE PLAY MECHANISM TO ELIMINATE FORCE FIGHTING

BACKGROUND OF THE INVENTION

Embodiments of the present invention relate to an actuator which is operable to reduce the likelihood of "force fighting" when used in conjunction with one or more other actuators as part of an actuator system. Embodiments of the invention are particularly suitable for use in aviation applications, such as in retraction and extension of aircraft landing gear.

Actuators are used in many fields of technology to transform an input signal into motion. In the field of aviation, actuators are used to displace various components into desired orientations/positions, such as the retraction and extension of landing gear, and displacing aerodynamic control surfaces into desired orientations. It has been well established to use hydraulically powered actuator systems for these roles, with a hydraulic fluid providing a medium through which the input signal is transformed into motion. However, hydraulic actuator systems require a complex infrastructure of pipework for containing and transferring hydraulic fluid. Such a complex infrastructure is prone to leakage and spills, thereby reducing the efficiency of operation of the actuator system and representing an environmental hazard. A leakage or spill of hydraulic fluid from the infrastructure pipework may ultimately lead to loss of actuation. The consequences of such a loss of actuation are severe for an aircraft, with the potential to lead to loss of aircraft control due to an inability to adjust the aerodynamic control surfaces and an inability to deploy the landing gear or lock the landing gear in position. In the worst case, failure of the hydraulic actuation systems in an aircraft can result in loss of the aircraft, and consequent loss of life. Unsurprisingly, the maintenance regime which is employed to protect against leakage and catastrophic failure of the infrastructure for the hydraulic actuator systems of an aircraft is necessarily rigorous and expensive, including costs incurred in recharging the hydraulic fluid and disposing of used hydraulic fluid.

To address these concerns, electrically powered actuators have been introduced in which an electric motor provides the source of power for the input signal of an actuator, the input signal then being transformed into motion. Electrically powered actuators avoid the need for the complex infrastructure associated with hydraulic actuation systems and have advantages of improved efficiency and reduced maintenance requirements as compared to hydraulic systems.

It is commonplace in many fields, especially aviation, to have systems requiring the use of two or more actuators which must cooperate together to achieve a desired result. A relevant example is for an aircraft landing gear for use in controlling extension and retraction of the landing gear. For example, U.S. Pat. No. 5,022,609 discloses a landing gear having a mechanism in the form of an over center linkage for locking the landing gear into either an extended ("downlock") or retracted ("unlock") position, thereby preventing collapse of the landing gear on landing of the aircraft or undesired deployment of the landing gear while in cruising flight. U.S. Pat. No. 5,022,609 discloses use of a first actuator 130 to unlock this mechanism, and the use of a second larger actuator 116 to subsequently retract the landing gear. Lack of synchronization between cooperating actuators, such as the two actuators of U.S. Pat. No. 5,022,609, can result in the actuators acting in opposition to one another. This undesired phenomenon is known as "force fighting". Known hydraulic actuator systems as conventionally used in landing gear systems mitigate some of the effects of force fighting through the cooperating actuators being operated from a common valve. The use of a common valve and some compressibility in the hydraulic fluid used in the cooperating actuators helps to minimize the effects of any force fighting between the cooperating actuators. However, it has been found that electrical actuator systems are vulnerable to unnecessary stresses being imposed on the cooperating actuators as a result of force fighting. This vulnerability is caused by various factors, including increased actuator stiffness due to the use of electrical actuators, without there being alleviation of force fighting stresses by compressibility of hydraulic fluid. Left unchecked, these stresses would result in failure of one or more of the cooperating actuators. A solution would be to employ complex control circuitry to ensure precise synchronized operation between cooperating actuators and thereby avoid the occurrence of force fighting. However, such control circuitry would add to the weight and size of the actuator systems, as well as adding complexity to the system design. Alternatively, designing actuators for an electrical actuator system which are able to withstand the additional stresses imposed as a result of "force fighting" would also result in increased actuator weight and size, which would thereby offset the benefits of using electrically powered actuators over known hydraulic actuator systems. Therefore, there is a need for an improved actuator which reduces or eliminates the undesired stresses caused by "force fighting" while minimizing the weight and size of the actuator.

BRIEF SUMMARY OF THE INVENTION

According to embodiments of the present invention, there is provided an actuator operable in response to one of an electrical and an electro-mechanical input signal. The actuator comprises an outer casing defined about a central axis, an output shaft disposed within the casing, the output shaft being axially moveable over a stroke length, and a drive mechanism cooperable with the output shaft to drive the output shaft along a part of the stroke length, wherein the actuator is operable such that the output shaft is drivable along all or part of the remainder of the stroke length by external loading while being unconstrained by the drive mechanism.

According to another embodiment of the present invention, an actuator system is provided. The system comprises an actuator operable in response to one of an electrical and an electro-mechanical input signal, the actuator comprising, an outer casing defined about a central axis, an output shaft disposed within the casing, the output shaft being axially moveable over a stroke length, and a drive mechanism co-operable with the output shaft to drive the output shaft along a part of the stroke length, wherein the actuator is configured such that the output shaft is drivable along all or part of the remainder of the stroke length by external loading while being unconstrained by the drive mechanism. The system further comprises at least one other actuator, and a locking mechanism having a locked state for retaining a component in a locked position. The driving of the output shaft along at least part of the stroke length transforms the locking mechanism from the locked state to an unlocked state, thereby enabling the at least one other actuator to displace the component from the locked position and drive the output shaft along all or part of the remainder of the stroke length while being unconstrained by the drive mechanism.

According to another embodiment of the present invention, an aircraft landing gear is provided. The aircraft landing gear comprises a wheel assembly, an actuator operable in response to one of an electrical and an electro-mechanical input signal, at least one other actuator, and a locking mechanism configured to lock the wheel assembly into at least one of a refracted position and an extended position. The actuator comprises an outer casing defined about a central axis, an output shaft disposed within the casing, the output shaft being axially moveable over a stroke length, and a drive mechanism co-operable with the output shaft to drive the output shaft along a part of the stroke length, wherein the actuator is configured such that the output shaft is drivable along all or part of the remainder of the stroke length by external loading while being unconstrained by the drive mechanism. The actuator is an unlock actuator configured to unlock the locking mechanism, the at least one other actuator is configured to displace the wheel assembly from its retracted or extended position, and the unlock actuator is configured to drive the output shaft along at least part of the stroke length to thereby transform the locking mechanism from a locked state to an unlocked state, thereby enabling the at least one other actuator to drive the output shaft along the remainder of the stroke length unconstrained by the drive mechanism to thereby displace the landing gear from its retracted or extended position.

BRIEF DESCRIPTION OF THE DRAWINGS

Embodiments of the present invention are described with reference to the following accompanying drawings.

DETAILED DESCRIPTION OF EXEMPLARY EMBODIMENTS OF THE INVENTION

Figure 1:
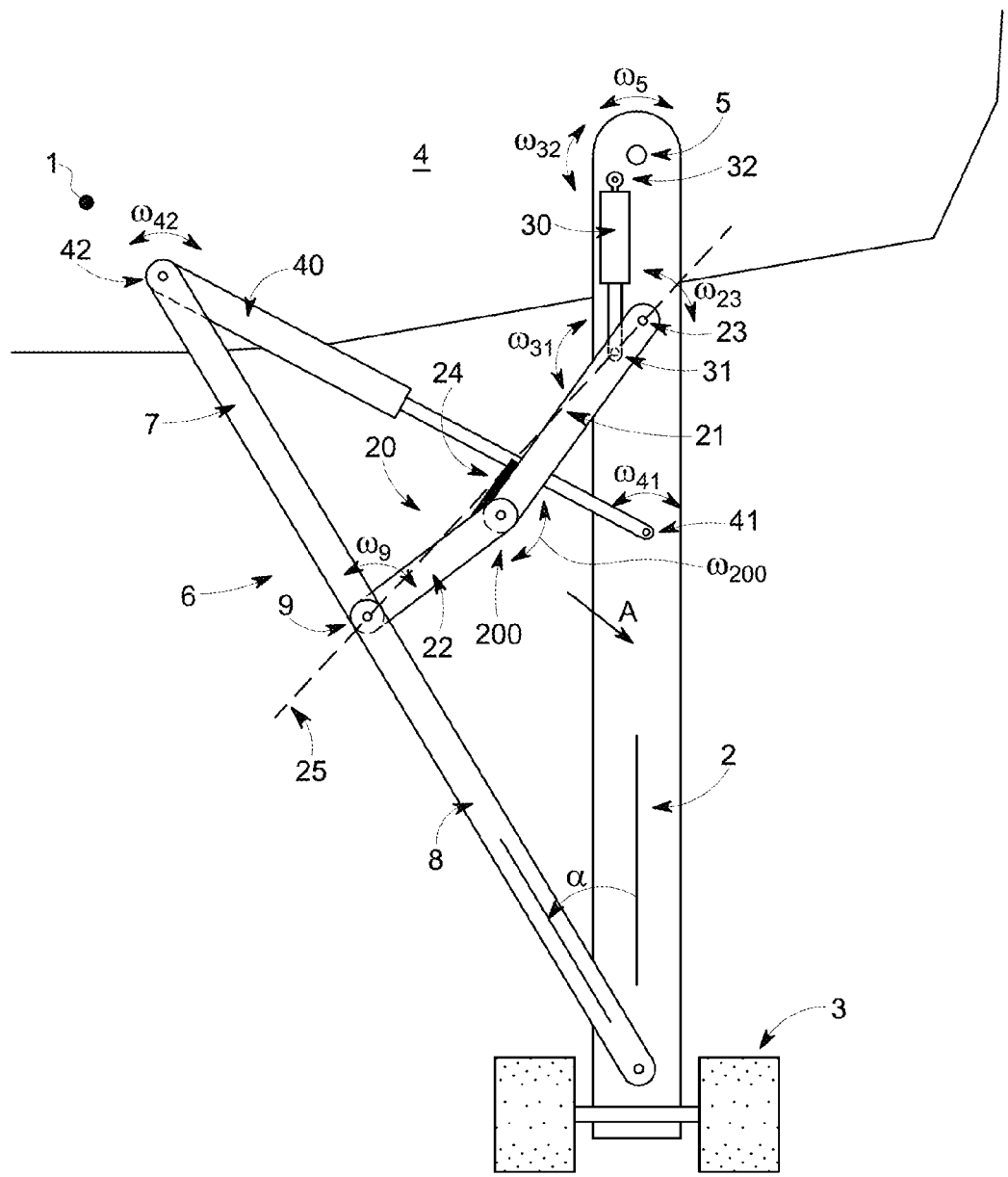
FIG. 1 shows a view of an aircraft landing gear which includes an actuator according to an embodiment of the present invention.

According to embodiments of the present invention, there is provided an actuator operable in response to one of an electrical and an electro-mechanical input signal. The actuator comprises an outer casing defined about a central axis, an output shaft disposed within the casing, the output shaft being axially moveable over a stroke length, and a drive mechanism co-operable with the output shaft to drive the output shaft along a part of the stroke length, wherein the actuator is operable such that the output shaft is drivable along all or part of the remainder of the stroke length by external loading while being unconstrained by the drive mechanism.

Having the actuator adapted so that for all or part of the remainder of the stroke length the output shaft is unconstrained by the drive mechanism introduces a "free play" type mechanism, which helps to eliminate or reduce unwelcome stresses in the actuator due to force fighting caused by conflict between the operation of the drive mechanism of the actuator and the external loading. The benefits are particularly apparent when applied to an aircraft landing gear, where the actuator according to embodiments of the present invention may be used to unlock a mechanism present for locking the landing gear in either or both of an extended position ("downlock") and a retracted position ("uplock"), thereby enabling a further actuator to then retract or extend the unlocked landing gear.

The actuator is co-operable with a locking mechanism and at least one other actuator, such that the driving of the output shaft along the at least part of the stroke length transforms the locking mechanism between a locked state to an unlocked state, thereby enabling the output shaft to be driven along all or part of the remainder of the stroke length under the action of the at least one other actuator while being unconstrained by the drive mechanism. The actuator arrangement as indicated in this paragraph is particularly suitable for application to an aircraft landing gear and associated related "downlock" and "uplock" linkages for locking the landing gear into extended or retracted positions. One non-limiting example of such a locking mechanism is an over center linkage. In the field of aviation, over center linkages are commonly used to "downlock" and "uplock" aircraft landing gear in extended and retracted positions.

Therefore, the actuator of the invention may form part of an actuator system. The actuator system comprises at least one other actuator and a locking mechanism, the locking mechanism having a locked state for retaining a component in a locked position, wherein the driving of the output shaft along the at least part of the stroke length transforms the locking mechanism from the locked state to an unlocked state, thereby enabling the at least one other actuator to displace the component and drive the output shaft along all or part of the remainder of the stroke length unconstrained by the drive mechanism. As indicated above, one non-limiting example of such a locking mechanism is an over center linkage. Further, the component may be an aircraft landing gear or part thereof.

As may be understood from the above paragraphs, embodiments of the present invention are of particular benefit when applied to an aircraft landing gear. Therefore, an aircraft landing gear comprises a wheel assembly, an actuator according to embodiments of the present invention, at least one other actuator and a locking mechanism for locking the wheel assembly into at least one of a retracted position and an extended position, the actuator being an unlock actuator operable to unlock the locking mechanism and the at least one other actuator operable to displace the wheel assembly from its retracted or extended position, the unlock actuator operable to drive the output shaft along at least part of the stroke length to thereby transform the locking mechanism from a locked state to an unlocked state, thereby enabling the at least one other actuator to drive the output shaft along the remainder of the stroke length unconstrained by the drive mechanism to thereby displace the wheel assembly from its retracted or extended position.

As indicated above, one non-limiting example of such a locking mechanism is an over center linkage. When applied to a landing gear for an aircraft, the drive mechanism of embodiments of the present invention provide an initial kick or impulse to unlock the locking mechanism that retains the wheel assembly in either retracted or extended positions, thereby permitting the at least one other actuator to displace the wheel assembly from its retracted or extended positions. The at least one other actuator serves to back-drive the locking mechanism and thereby the actuator according to embodiments of the present invention over all or part of the remainder of its stroke length. The free play or lack of constraint provided by the actuator according to embodiments of the present invention enables the actuator and the at least one other actuator to operate out of synchronization with one another, but without imposing significant stresses on the actuator according to embodiments of the present invention. This free play or lack of constraint allows the size and weight of the actuator according to embodiments of the present invention to be kept to a minimum. The free play or lack of constraint also allows use of a far simpler control loop mechanism for the at least one actuator and allows for elimination of the need for precise positional control of the actuator according to embodiments of the present invention. Further, the actuator according to embodiments of the present invention also provides benefits of improved ease of maintenance, without the need for time consuming rigging of the actuators of the landing gear during their replacement.

According to an embodiment of the present invention, the drive mechanism comprises one or more cam members. These cam members may be eccentric in profile. The output shaft may be connected to a piston member, with rotation in use of the one or more cam members acting against the piston member to urge the piston member and the output shaft along part of the stroke length.

According to an embodiment of the present invention, power is supplied to the drive mechanism by one or more electric motors disposed about the outside of the outer casing of the actuator.

The actuator may further comprise a biasing member arranged to oppose displacement of the output shaft along the stroke length in the direction induced by the drive mechanism. The function of such a biasing member is to prevent uncontrolled displacement to and fro of the output shaft within the outer casing of the actuator, with the stiffness of the biasing member selected so as not to impede motion of the output shaft along the stroke length due to the action of the drive mechanism or the external loading. The biasing member may be of any conventional form, including, but without limitation to, a spring.

FIG. 1 shows an aircraft landing gear 1 in an extended position. The landing gear 1 includes a longitudinal strut 2, with a wheel assembly 3 mounted to a lower end of the strut. The landing gear 1 is mounted to an airframe 4 of an aircraft by means of a pivotal joint 5 between the upper end of the strut 2 and the airframe 4. The pivotal joint 5 allows rotation of the strut 2 about an axis as indicated by arrow $\omega_5$. A two-part side brace 6 is pivotally connected to a lower end of the strut 2, and extends diagonally upwardly towards the airframe 4 and inclined at an angle $\alpha$ relative to the strut 2. The two-part side brace 6 includes a first part 7 and a second part 8, the two parts pivotally connected 9 partway along the length of the brace. The pivotal connection 9 allows rotation about an axis as indicated by arrow $\omega_9$. As can be seen from FIG. 1, with the landing gear 1 in the extended position the first and second parts 7, 8 of the brace 6 are co-linear.

Figure 2:
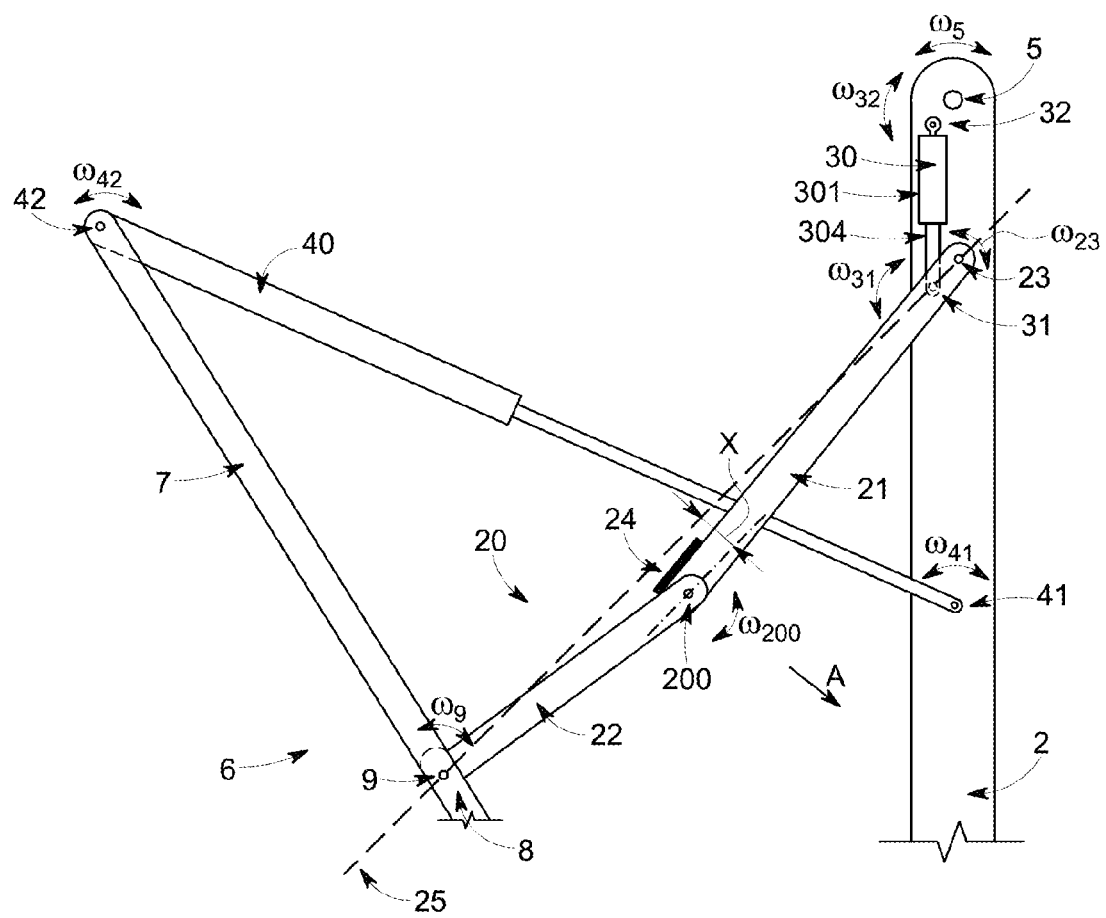
FIG. 2 shows a detail view of part of FIG. 1, focused on an over center linkage of the landing gear.

An over center linkage having the general designation 20 extends between a pivotal connection 23 at the upper end of the strut 2 and the pivotal connection 9 of the brace. FIGS. 1 and 2 show the over center linkage 20 in a locked state in which the linkage locks the wheel assembly 3 of the landing gear 1 in the extended position. This locked state inhibits collapse of the landing gear 1 on impact of the wheel assembly 3 with the ground. When in its locked state, the over center linkage 20 ensures that both parts 7, 8 of the two part brace 6 remain locked in a co-linear state and are thereby able to resist any forces acting to collapse the landing gear 1. As can be seen more clearly from FIG. 2, the over center linkage 20 has a first part 21 extending diagonally downwards from the pivotal connection 23 and a second part 22 extending diagonally upwards from the pivotal connection 9. Both parts 21, 22 are pivotally connected as shown by reference numeral 200 on FIG. 2. The pivotal connection 200 allows rotation about an axis as indicated by $\omega_{200}$. The ability of the over center linkage 20 to lock the landing gear 1 into the extended position shown in FIG. 1 can be more clearly understood from FIG. 2.

As shown in FIG. 2, the first part 21 of the over center linkage 20 includes a stop lug 24 which extends laterally outwardly from a longitudinal edge of first part 21 of the linkage 20 in the region of the pivotal connection 200. The lug member 24 serves to limit displacement of the pivotal connection 200 in the direction of arrow A. FIG. 2 shows a line 25 extending between the pivotal connection 23 and the pivotal connection 9. An over center distance X is represented by the perpendicular distance from the line 25 to the pivotal connection 200 between the two parts 21, 22 of the over center linkage 20. As can be understood from the drawings and the above text, the over center linkage 20 serves to lock the side brace 6 and thereby the wheel assembly 3 of the landing gear 1 in the extended position. Folding of the two-part brace 6 about the pivotal connection 9 and rotation of the strut 2 about the pivotal joint 5 to enable the wheel assembly 3 to be retracted first requires the over center distance X to be defeated.

The landing gear 1 includes two linear actuators 30, 40. The linear actuator 30 is the smaller of the two actuators and performs the function of defeating the over center distance X. The actuator 30 is as per an embodiment of the invention. The actuator 40, being the larger of the two actuators, performs the function of folding the two-part side brace 6 and thereby rotating the strut 2 about pivotal joint 5 to thereby retract the wheel assembly 3. The actuators 30, 40 are referred to herein as the unlock actuator 30 and main actuator respectively 40.

The unlock actuator 30 is connected between a pivotal connection 31 on the first part 21 of the over center linkage 20 and a pivotal connection 32 on the strut 2. The main actuator 40 is connected between a pivotal connection 41 on the strut 2 and a pivotal connection on the upper end of the side brace 6. The pivotal connections 31, 32, 41, 42 allow rotation about respective axes as indicated by $\omega_{31}$, $\omega_{32}$, $\omega_{41}$ and $\omega_{42}$.

Figure 3:
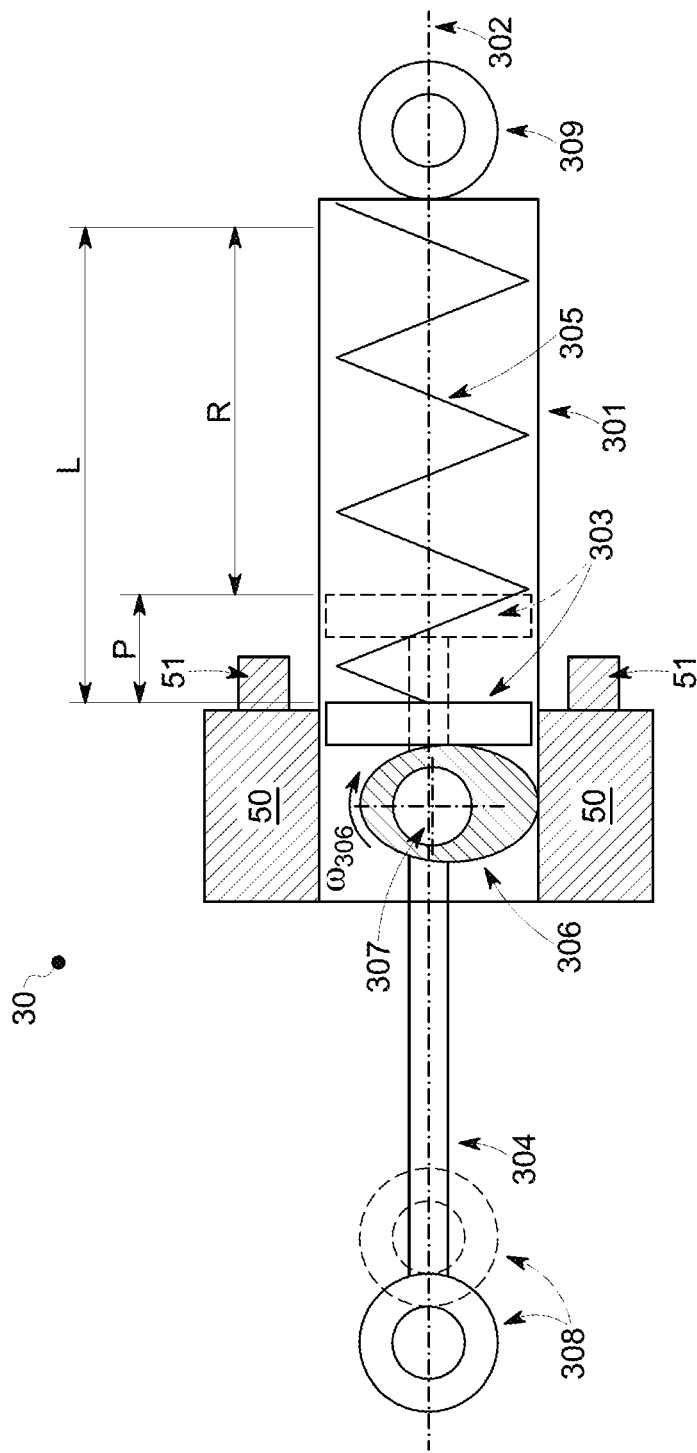
FIG. 3 shows a sectional view through an actuator at its full length according to an embodiment of the present invention.

FIG. 3 shows a sectional view applicable to an embodiment of the invention suitable for use as the unlock actuator 30. The unlock actuator 30 has an outer casing 301 concentric about a longitudinal axis 302. A piston 303 is disposed within the outer casing 301 and is connected to an output shaft 304. A biasing member 305 in the form of a spring is provided within the casing and is arranged between one end face of the piston 303 and an end of the unlock actuator 30. A drive mechanism 306 incorporating a rotatable eccentric cam member is present at the other end of the unlock actuator 30. The cam member 306 is mounted to and rotatable about a shaft 307 in the sense indicated by $\omega_{306}$. With the unlock actuator 30 at its full length, the cam member acts against the other end face of the piston 303. Eye ends 308, 309 are present to secure the unlock actuator 30 in position; in the case of the embodiment shown in FIGS. 1 and 2, the eye ends 308, 309 secure the actuator 30 to pivotal connections 31, 32 of the aircraft landing gear 1. The unlock actuator 30 has a stroke length L, which represents the maximum degree of travel of the piston 303 and the output shaft 304 along the axis 302. The stroke length L also represents the maximum shortening of the distance between the two eye ends 308, 309 and thereby the maximum degree of travel of the output shaft 304 of the unlock actuator 30.

As indicated in FIG. 3, one or more electric motors 50 are attached to the outside of the casing 301 for providing power to rotate the eccentric cam member of the drive mechanism 306. Electricity is provided to power the one or more electric motors by means of electrical connections 51.

With the wheel assembly 3 of the aircraft landing gear 1 locked in the extended position as shown in FIG. 1, the landing gear is retracted as indicated in the following paragraphs.

Power is supplied from the one or more electric motors 50 to rotate $\omega_{306}$ the eccentric cam member of the drive mechanism 306. The cam member acts against the piston 303 to drive the piston and the output shaft 304 along the axis 302 for a distance P, thereby causing the unlock actuator 30 to shorten in length. The position of the piston 303, output shaft 304 and the associated eye end 308 after traveling the distance P is shown in FIG. 3 by dashed lines. The driving force provided by the cam member of the drive mechanism 306 is sufficient to overcome the biasing force imposed by the biasing member 305. As can be seen from FIGS. 3 and 4, the distance P is only a part of the total stroke length L of the unlock actuator 30. The distance P represents the maximum distance through which the drive mechanism is operable to drive the piston 303 and the output shaft 304 along the stroke length L. In driving the output shaft 304 through distance P, the unlock actuator 30 upwardly displaces the first part 21 of the over center linkage 20, thereby correspondingly displacing pivot connection 200 upwardly of line 25 to thereby eliminate the over center distance X and defeat the downlock provided by the over center linkage 20. At this point, the main actuator 40 actuates to retract the wheel assembly 3 of the landing gear 1. In so doing, the main actuator 40 back-drives the piston 303 and thereby the output shaft 304 along the remaining distance R of the stroke length L. As can be understood from FIGS. 3 and 4, arranging the drive mechanism 306 to only drive the output shaft 304 along part P of the stroke length L provides a degree of free play in the unlock actuator 30 during operation of the main actuator 40. This free play (otherwise referred to as a lack of constraint) allows for the two actuators 30, 40 to be able to operate out of synchronization without imposing unnecessary stresses on the unlock actuator 30.

Although the unlock actuator 30 is described in use in unlocking the wheel assembly 3 of the aircraft landing gear 1 from the extended position, it is equally applicable to use such an unlock actuator 30 in unlocking the wheel assembly 3 of the aircraft landing gear 1 from a retracted position.

The description uses examples to disclose the invention and also to enable a person skilled in the art to make and use the invention. For the avoidance of doubt, the invention as defined in the claims may include within its scope other examples that occur to those skilled in the art which may differ from those examples indicated in the figures of this document.

What is claimed is:

1. An actuator operable in response to one of an electrical and an electro-mechanical input signal, the actuator comprising:
   an outer casing defined about a central axis;
   an output shaft disposed within the casing, the output shaft being axially moveable over a stroke length; and
   a drive mechanism co-operable with the output shaft to drive the output shaft along a part of the stroke length, wherein the actuator is configured such that the output shaft is drivable along all or part of the remainder of the stroke length by external loading while being unconstrained by the drive mechanism.

2. The actuator according to claim 1, wherein the drive mechanism comprises one or more cam members.

3. The actuator according to claim 1, further comprising one or more electric motors disposed about the outside of the outer casing and configured to provide power to the drive mechanism.

4. The actuator according to claim 1, further comprising a biasing member configured to oppose displacement of the output shaft along the stroke length in the direction induced by the drive mechanism.

5. The actuator according to claim 1, wherein the actuator is co-operable with a locking mechanism and at least one other actuator, such that the driving of the output shaft along at least part of the stroke length transforms the locking mechanism between a locked state and an unlocked state, thereby enabling the output shaft to be driven along all or part of the remainder of the stroke length under the action of the at least one other actuator while being unconstrained by the drive mechanism.

6. An actuator system comprising:
   an actuator operable in response to one of an electrical and an electro-mechanical input signal, the actuator comprising:
      an outer casing defined about a central axis;
      an output shaft disposed within the casing, the output shaft being axially moveable over a stroke length; and
      a drive mechanism co-operable with the output shaft to drive the output shaft along a part of the stroke length, wherein the actuator is configured such that the output shaft is drivable along all or part of the remainder of the stroke length by external loading while being unconstrained by the drive mechanism;
   at least one other actuator; and
   a locking mechanism having a locked state for retaining a component in a locked position,
   wherein the driving of the output shaft along at least part of the stroke length transforms the locking mechanism from the locked state to an unlocked state, thereby enabling the at least one other actuator to displace the component from the locked position and drive the output shaft along all or part of the remainder of the stroke length while being unconstrained by the drive mechanism.

7. The actuator system according to claim 6, wherein the locking mechanism comprises an over center linkage.

8. An aircraft landing gear comprising:
   a wheel assembly;
   an actuator operable in response to one of an electrical and an electro-mechanical input signal, the actuator comprising:
      an outer casing defined about a central axis;
      an output shaft disposed within the casing, the output shaft being axially moveable over a stroke length; and
      a drive mechanism co-operable with the output shaft to drive the output shaft along a part of the stroke length, wherein the actuator is configured such that the output shaft is drivable along all or part of the remainder of the stroke length by external loading while being unconstrained by the drive mechanism;
   at least one other actuator; and
   a locking mechanism configured to lock the wheel assembly into at least one of a retracted position and an extended position,
   wherein the actuator is an unlock actuator configured to unlock the locking mechanism, wherein the at least one other actuator is configured to displace the wheel assembly from its retracted or extended position, and wherein the unlock actuator is configured to drive the output shaft along at least part of the stroke length to thereby transform the locking mechanism from a locked state to an unlocked state, thereby enabling the at least one other actuator to drive the output shaft along the remainder of the stroke length unconstrained by the drive mechanism to thereby displace the landing gear from its retracted or extended position.

9. The aircraft landing gear according to claim 8, wherein the locking mechanism comprises an over center linkage.

* * * * *